United States Patent
Liu

(10) Patent No.: US 8,902,111 B2
(45) Date of Patent: Dec. 2, 2014

(54) CALCULATING ANTENNA PERFORMANCE

(75) Inventor: Jigang Liu, Shaanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 1109 days.

(21) Appl. No.: 12/707,510

(22) Filed: Feb. 17, 2010

(65) Prior Publication Data

US 2011/0050515 A1    Mar. 3, 2011

(30) Foreign Application Priority Data

Aug. 25, 2009    (CN) .......................... 2009 1 0167463

(51) Int. Cl.
  *G01R 29/10*    (2006.01)
  *H04B 17/00*    (2006.01)
  *H01Q 21/24*    (2006.01)
  *H04B 7/10*    (2006.01)

(52) U.S. Cl.
  CPC ........ *H01Q 21/24* (2013.01); *H04B 7/10* (2013.01); *H04B 17/0012* (2013.01); *H01Q 21/245* (2013.01)
  USPC .......... 343/703; 455/67.1; 455/67.4; 455/115

(58) Field of Classification Search
  CPC ....... G01R 29/10; G01R 29/0878; H01Q 1/00
  USPC ................... 343/703; 455/67.1, 67.4, 115
  See application file for complete search history.

(56) References Cited

U.S. PATENT DOCUMENTS

| | | | |
|---|---|---|---|
| 5,233,537 A | 8/1993 | Tietsworth | |
| 5,300,939 A | 4/1994 | Maeda et al. | |
| 5,507,101 A | 4/1996 | Mason | |
| 5,548,820 A * | 8/1996 | Victorin | 455/67.14 |
| 5,574,981 A | 11/1996 | Ahonen | |
| 5,590,415 A | 12/1996 | Peltola et al. | |
| 5,815,805 A * | 9/1998 | Crnkovic et al. | 455/78 |
| 6,178,310 B1 * | 1/2001 | Jeong | 455/67.11 |

(Continued)

FOREIGN PATENT DOCUMENTS

| | | |
|---|---|---|
| CN | 1159278 A | 9/1997 |
| CN | 1368828 A | 9/2002 |

(Continued)

OTHER PUBLICATIONS

International Search Report and Written Opinion for International Application No. PCT/CN2010/073006, mailed on Aug. 26, 2010.

*Primary Examiner* — Dameon E Levi
*Assistant Examiner* — Collin Dawkins
(74) *Attorney, Agent, or Firm* — Brundidge & Stanger, P.C.

(57) ABSTRACT

A system and method for detecting the performance of a bi-polarized antenna including two antennas in a wireless communication system is provided. The system may include at least one directional coupler connected to the bi-polarized antenna configured to couple a transmitting signal of the first antenna and another signal from the bi-polarized antenna; a power detector connected to the at least one directional coupler and configured to measure the power of the transmitting signal and the another signal as analog results, respectively; an analog-digital converter connected to the power detector and configured to convert the analog results into digital results; and a processing unit connected to the analog-digital converter and configured to calculate the difference of the digital results. The performance of the bi-polarized antenna can be accessed by the above-measured polarization isolation.

11 Claims, 3 Drawing Sheets

(56) References Cited

U.S. PATENT DOCUMENTS

| | | |
|---|---|---|
| 6,329,953 B1 | 12/2001 | McKivergan |
| 2006/0192973 A1 | 8/2006 | Aiyer et al. |
| 2008/0012756 A1 | 1/2008 | Stagliano et al. |
| 2008/0174502 A1* | 7/2008 | Oren et al. .................... 343/703 |
| 2009/0088082 A1* | 4/2009 | Sigmund .................... 455/67.11 |
| 2009/0274072 A1* | 11/2009 | Knox ............................ 370/278 |

FOREIGN PATENT DOCUMENTS

| | | |
|---|---|---|
| CN | 101128718 A | 2/2008 |
| CN | 201039169 Y | 3/2008 |
| CN | 101217303 A | 7/2008 |
| WO | WO-2007/075021 A1 | 7/2007 |
| WO | 2008062380 A2 | 5/2008 |

\* cited by examiner

CALCULATING ANTENNA PERFORMANCE

BACKGROUND

In a wireless communication system, an indoor unit and an outdoor unit of a base station may be located away from each other. For example, a base transceiver station (BTS) is generally the indoor unit located inside a building, and an antenna is the outdoor unit located outside above the ground on a rooftop. Usually, a RF signal generated and outputted from the indoor unit is transmitted to the outdoor unit via a cable, jumper and the like. When a malfunction or an error occurs within the wireless communication system, it may be difficult to locate or pinpoint where the malfunction or error occurred. Often, it requires a technician to disassemble the transmission line and climb to the location of the antenna on the rooftop to do on site measurements, which may be dangerous and risky.

In addition, employing a RF remote module in a wireless communication system is becoming more popular in order to improve system performance. However, when a RF remote module experiences a problem, it is necessary to locate and evaluate the problem of the module.

At the same time, operation of a bi-polarized antenna in the wireless communication system involves determining many technical parameters such as voltage standing wave ratio (VSWR), isolation and the like. Measurement of these parameters may be important. VSWR may indicate transmission reflection characteristics of a remote unit, in particular, a passive component and an antenna unit. Polarization isolation is an important parameter for a bi-polarized antenna.

Polarization may describe the path of directional change of electrical field. The mobile communication system often uses uni-polarization antennas. Recently the bi-polarization antenna is becoming popular, which is an antenna with two cross-over antenna polarization directions. Using bi-polarization antennas may reduce the number of antennas used in a system, because one bi-polarization antenna may replace two independent uni-polarization antennas. However, it is difficult to detect the performance of the bi-polarized antenna.

SUMMARY OF THE DISCLOSURE

In one aspect, a system for detecting the performance of a bi-polarized antenna including two antennas in a wireless communication system is provided, and the system may include at least one directional coupler connected to the bi-polarized antenna configured to couple a transmitting signal of the first antenna and another signal from the bi-polarized antenna; a power detector connected to the at least one directional coupler and configured to measure the power of the transmitting signal and the another signal as analog results, respectively; an analog-digital converter connected to the power detector and configured to convert the analog results into digital results; and a processing unit connected to the analog-digital converter and configured to calculate the difference of the digital results.

Alternatively, a method of detecting the performance of a bi-polarized antenna including two antennas in a wireless communication system is provided. The method may include coupling a transmitting signal of the first antenna and another signal from the bi-polarized antenna; measuring the power of the transmitting signal and the another signal as analog results respectively; converting the analog results into digital results; and calculating the difference of the digital results of the power of the transmitting signal and the other signal.

The performance of the bi-polarized antenna may be assessed and a malfunction point may be located by the above-measured polarization isolation and/or VSWR.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
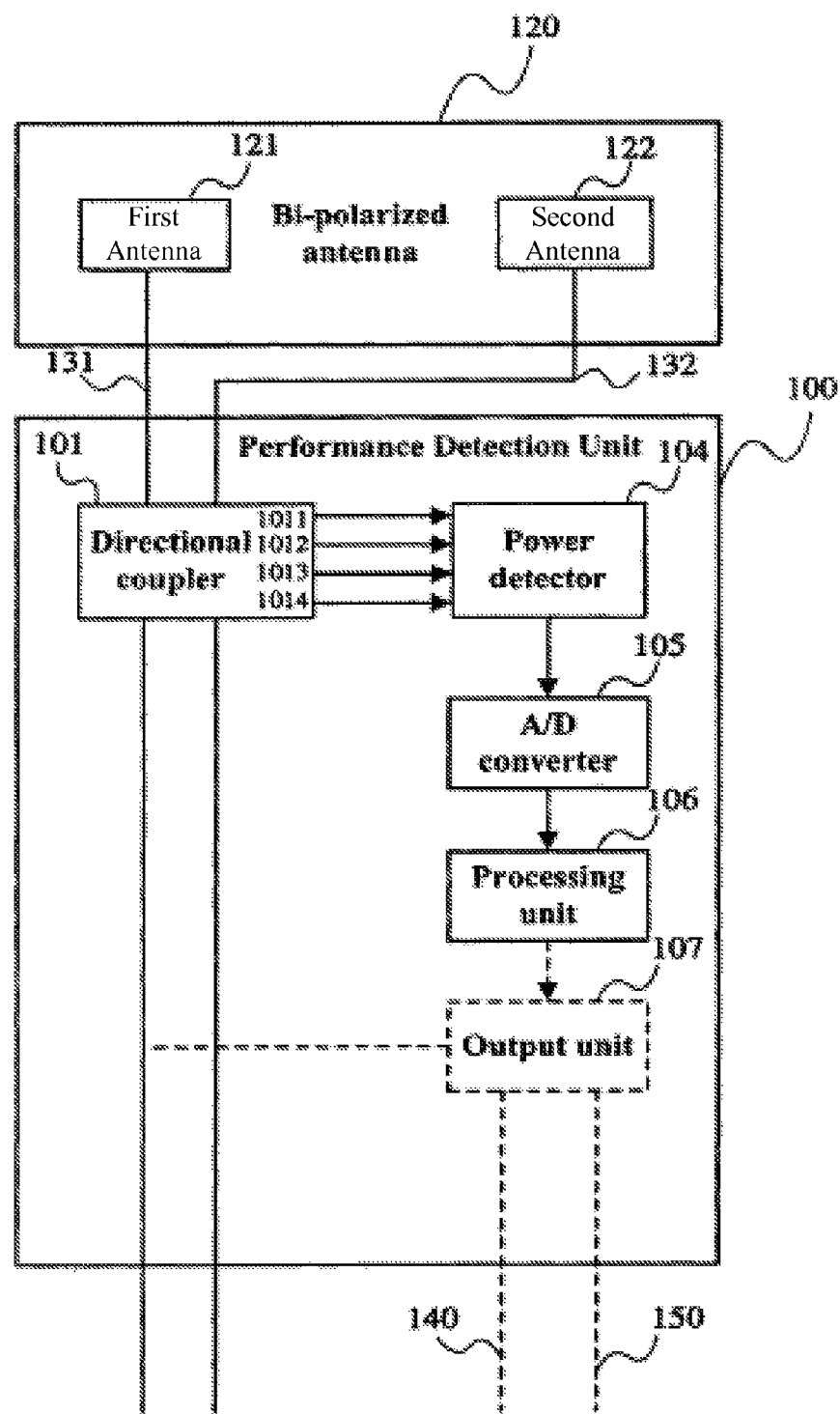
FIG. 1 illustrates a block diagram of a system for detecting the performance of a bi-polarized antenna in a wireless communication system according to an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

The disclosure is drawn, inter alfa, to methods, systems and computer program products related to antenna performance detection. For example, the disclosure provides systems, methods and computer program products to detect the performance of a bi-polarized antenna, which measure polarization isolation and/or VSWR of the bi-polarized antenna.

FIG. 1 illustrates a block diagram of a system for detecting the performance of a bi-polarized antenna in a wireless communication system according to an embodiment of the present disclosure.

FIG. 1 further shows a performance detection unit 100 coupled to a bi-polarized antenna 120. The performance detection unit 100 includes but is not limited to a directional coupler 101, a power detector 104, an analog-digital (A/D) converter 105, and a processing unit 106. The performance detection unit 100 optionally includes an output unit 107. The bi-polarized antenna 120 typically includes two antennas, including, e.g., first antenna 121 and second antenna 122, also referred to as antenna 121 and antenna 122, respectively, hereinafter.

The directional coupler 101 of FIG. 1 is coupled to the antennas 121 and 122 of the bi-polarized antenna 120 via antenna cables 131, 132 respectively, and generates coupled signals based on signals transmitted to or from the antennas 121 and 122, respectively. The directional coupler 101 is further coupled to the power detector 104, and outputs the coupled signals to the power detector 104. The directional coupler 101 may include four output ports, namely, transmitting signal output ports 1011 and 1013, and the reflecting and inducing signal output ports 1012 and 1014. The directional coupler 101 is coupled via the transmitting signal output ports 1011 and 1013 and the reflecting and inducing signal output ports 1012 and 1014 to one or more input ports of the power detector 104. However, the number of the output ports of the directional coupler 101 and the input ports of the power detector 104 are not limited to the above, which may be any number as long as the present disclosure may be realized. The power detector 104 is coupled to the A/D converter 105, and outputs detecting results to the A/D converter 105. The A/D converter 105 is coupled to the processing unit 106, and converts the detecting result signal to a digital signal and outputs the same to the processing unit 106. The processing unit 106 receives the detecting result in digital format from the A/D converter 105, and processes the result. Optionally, the output unit 107 is coupled to the processing unit 106, receives signals outputted by the processing unit 106, and outputs the same to an outside device for further processing.

The bi-polarized antenna 120 of FIG. 1 may be used as an outdoor unit of the base station in a wireless communication system. Bi-polarized antenna 120 includes but is not limited to two antennas. The directional coupler 101 includes, but is not limited to, a low insertion loss coupler. The number of the directional coupler 101 is not limited to "one." It may be any natural number such as two, three, four and the like. Attenuation ratio provided by the coupling operation of the directional coupler 101 may be configured such that the power of the signals outputted to the power detector 104, such as the signals generated by coupling the signals transmitted to/from the antennas 121 and 122, falls within the detecting range of the power detector 104, e.g. −10~−70 dBm. The power detector 104, the A/D converter 105 and the processing unit 106 may typically be realized by those skilled in the art. The processing unit 106 may be, but not limited to, a microprocessor. Alternatively, the A/D converter 105 may be integrated with the power detector 104 or the processing unit 106.

In FIG. 1, the processing unit 106 is further configured to control the operations of all elements of the performance detection unit 100 and/or start up the whole operation of the performance detection unit 100 in accordance with a control signal from a control center which is located within or outside the performance detection unit 100. In one embodiment, the performance detection unit 100 may be designed to be constantly running to perform the detection.

In accordance with another illustrative embodiment, the output unit 107 may output signals generated by the processing unit 106 via at least one of antenna cables 131, 132, a separate wire/line 140, a wireless connection 150 or the like to a unit outside the performance detection unit 100 for further processing or displaying, or output the results directly on site in audio or graphic format with an audio device or a displaying device.

The manner of connections among all elements (units) of the disclosure is not limited to the above description, which may be realized by those skilled in the art with any known technology.

Figure 2:
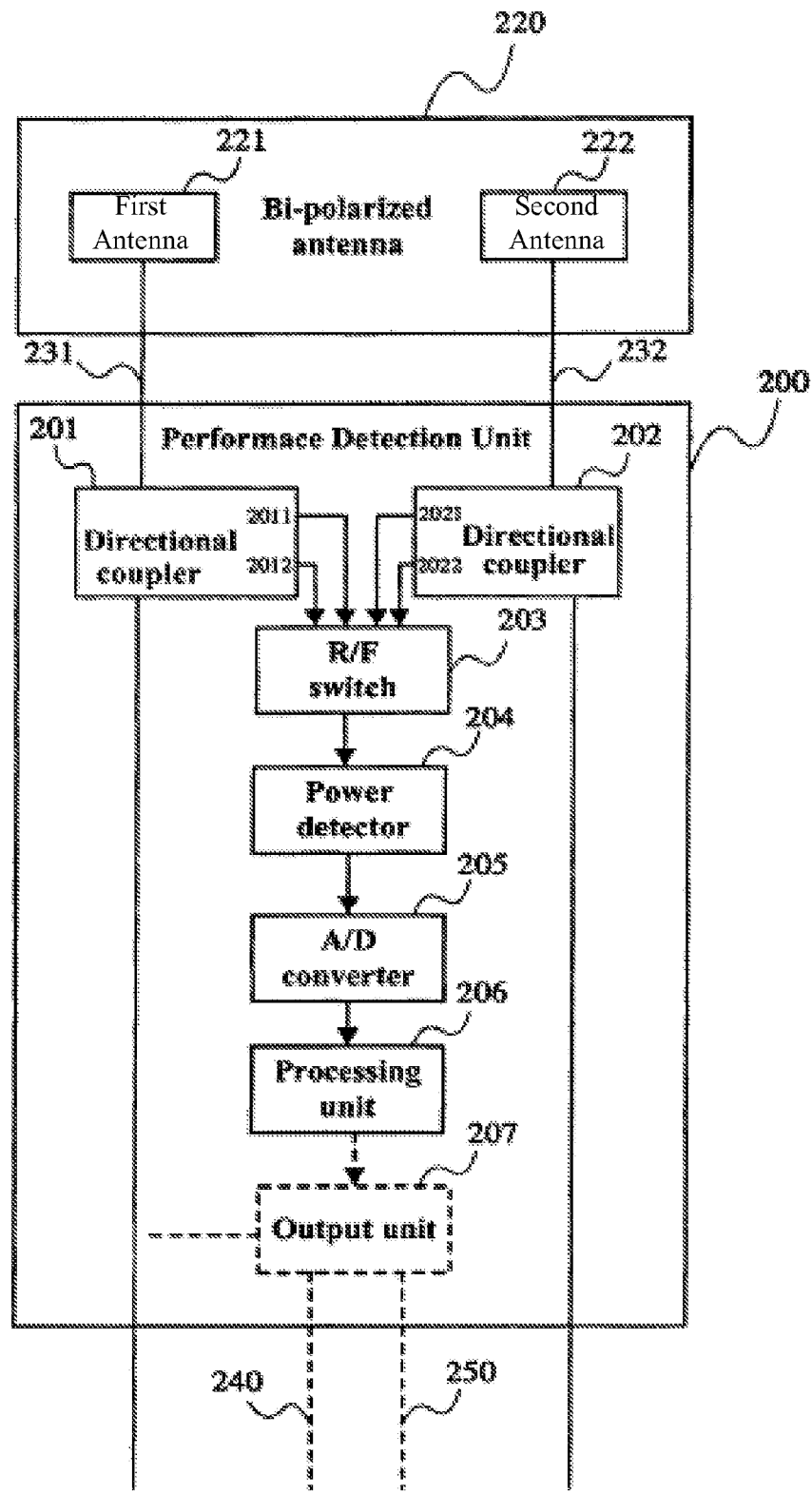
FIG. 2 illustrates a block diagram of a system for detecting the performance of a bi-polarized antenna in a wireless communication system according to another embodiment of the present disclosure.

FIG. 2 illustrates a block diagram of a system of detecting the performance of a bi-polarized antenna in a wireless communication system according to another embodiment of the present disclosure.

FIG. 2 further shows a performance detection unit 200 coupled to a bi-polarized antenna 220 as another embodiment. The performance detection unit 200 of FIG. 2 may include but not limited to two directional couplers 201 and 202, a radio frequency (RF) switch 203, a power detector 204, an analog-digital (A/D) converter 205, and a processing unit 206. The performance detection unit 200 optionally includes an output unit 207. The bi-polarized antenna 220 may include, but is not limited to, two antennas including, e.g., first antenna 221 and second antenna 222, also referred to as antenna 221 and antenna 222, respectively, hereinafter.

In FIG. 2, the directional coupler 201 is coupled to the antenna 221 via antenna cable 231, and generates coupled signals based on signals transmitted to or from the antennas 221. The directional coupler 202 is connected to the antenna 222 via antenna cable 232, and generates coupled signals based on signals transmitted to or from the antennas 222. The directional couplers 201 and 202 are coupled to the RF switch 203. Further, the directional coupler 201 may include two output ports which are a transmitting signal output port 2011, and a reflecting and inducing signal output port 2012. The directional coupler 202 may include two output ports, namely, transmitting signal output port 2021, and reflecting and inducing signal output port 2022. The directional couplers 201 and 202 are coupled via the transmitting signal output ports 2011 and 2021 and the reflecting and inducing signal output ports 2012 and 2022 to one or more input ports of the RF switch 203. However, the number of the output ports of the directional couplers 201 and 202 and the input ports of the RF switch 203 are not limited to the above, which may be any number as long as the present disclosure may be realized. In accordance with one illustrative embodiment, the power detector 204 is coupled to the RF switch 203, and it is configured to receive the coupled signals from the antennas 221 and 222 through the directional couplers 201 and 202 in response to the RF switch 203 being switched to each of the output ports 2011, 2012, 2021 and 2022.

The RF switch 203 is coupled to the power detector 204, and outputs the couple signals to the power detector 204. The power detector 204 is coupled to the A/D converter 205, and outputs the detecting result to the A/D converter 205. The A/D converter 205 is coupled to the processing unit 206, and converts the detecting result signal to a digital signal and outputs the same to the processing unit 206. The processing unit 206 processes the received result, and generates the processed result. Optionally, the output unit 207 is coupled to the processing unit 206, receives signals outputted by the processing unit 206, and output the same to an outside device for further processing.

The bi-polarized antenna 220 of FIG. 2 may be used as outdoor unit of the base station in a wireless communication system. Bi-polarized antenna 220 may include, but is not limited to, two antennas. The directional couplers 201 and 202 may be, but is not limited to, low insertion loss couplers. The number of the directional couplers 201 and 202 are not limited to "two", it may be any natural number such as the directional couplers 201 and 202 may be designed such that the power of the signals outputted to the power detector 204, such as the signals generated by coupling the signals transmitted to/from the antennas 121 and 122, falls within a detecting range of the power detector 204, e.g. −10~−70 dBm. The RF switch 203, the power detector 204, the A/D converter 205 and the processing unit 206 may be realized by those skilled in the art. The processing unit 206 may be but not limited to a microprocessor. Alternatively, the RF switch 203 may be integrated with the power detector 204, and the A/D converter 205 may be integrated with the power detector 204 or the processing unit 206.

The processing unit 206 of FIG. 2 is further configured to control the operations of all elements of the performance detection unit 200 and/or start up the whole operation of the performance detection unit 200 in accordance with a control signal from a control center which is located within or outside the performance detection unit 200. Alternatively, the processing unit 206 is further configured to control the operation of the RF switch 203. Alternatively, the performance detection unit 200 may be designed to be constantly running to perform the detection.

In accordance with another illustrative embodiment, the output unit 207 may output signals generated by the processing unit 206 via at least one of antenna cables 231, 232, a separate wire/line 240, a wireless connection 250 or the like to an unit outside the performance detection unit 200 for further processing or displaying, or output the results directly on site in audio or graphic format with an audio device or a displaying device.

The manner of connections among all elements (units) of the disclosure is not limited to the above description, which may be realized by those skilled in the art with any known technology.

Figure 3:
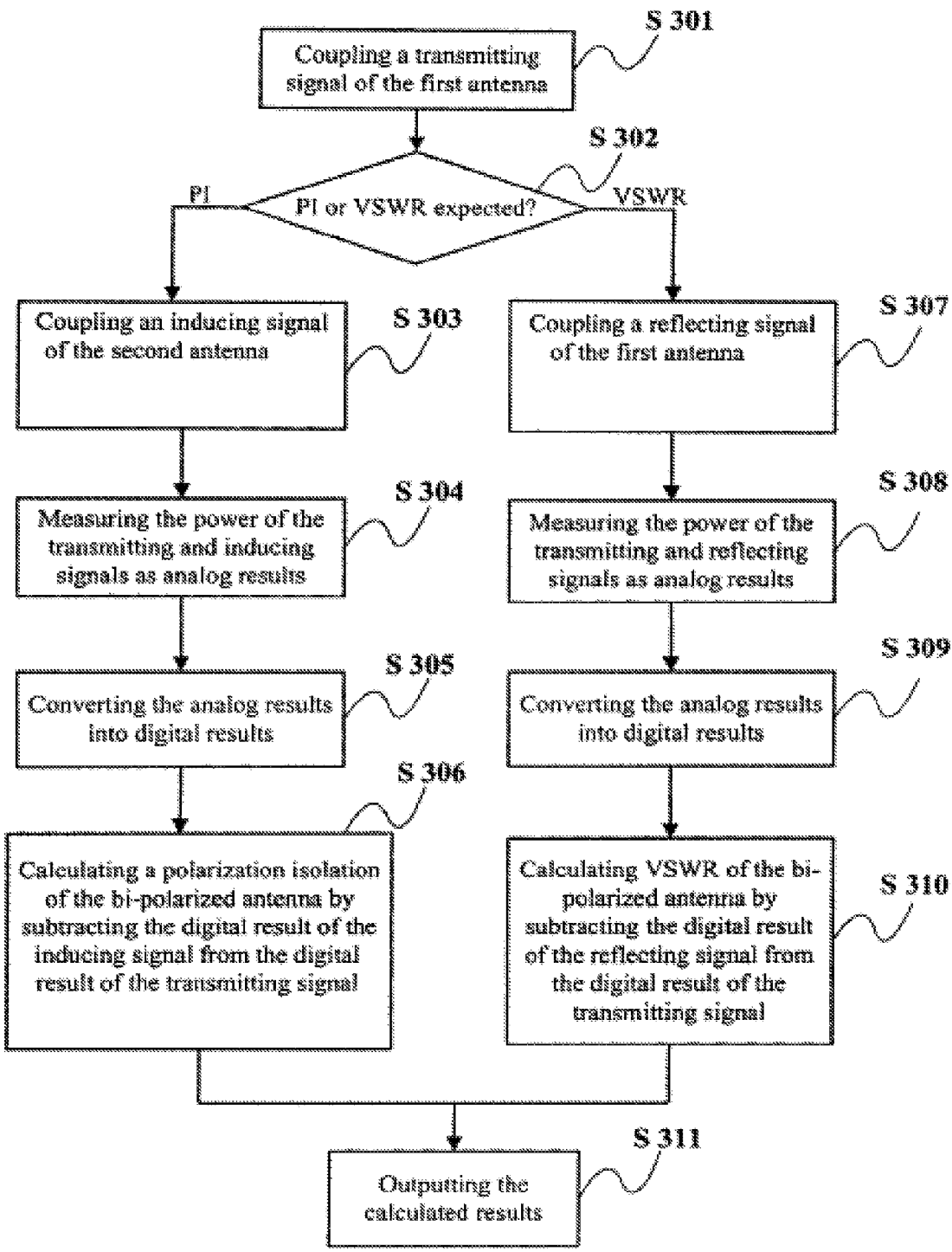
FIG. 3 illustrates a flow chart of a method of detecting the performance of a bi-polarized antenna in a wireless communication system according to an embodiment of the present disclosure.

FIG. 3 illustrates a flow chart of a method of detecting the performance of a bi-polarized antenna in a wireless communication system according to an embodiment of the present disclosure.

In step S301 of FIG. 3, a transmitting signal of a first antenna is coupled. In the step S302, it is decided whether polarization isolation between the bi-polarized antennas or a voltage standing wave ratio of the bi-polarized antenna is expected to be measured. Furthermore, if it is decided that the polarization isolation is expected to be measured, the operation goes to step S303. If it is decided that the voltage standing wave ratio of the bi-polarized antenna is expected to be measured, the operation goes to step S307. This determination may be made, i.e., by the processing unit, optionally based on received user input, etc.

In the step S303, an inducing signal of a second antenna is coupled. Here, the inducing signal of the second antenna is a signal induced wirelessly in the second antenna by receiving the transmitting signal of the first antenna. In the step S304, the power of the transmitting signal of the first antenna is measured as an analog result, and the power of the inducing signal of the second antenna is measured as an analog result as well. Furthermore, in the step S305, the analog result of the power of the transmitting signal of the first antenna is converted into a digital result, which may be saved as a value A and the analog result of the power of the inducing signal of the second antenna is converted into another digital result, which may be saved as a value B. These values may be stored in internal memory of the processing unit. Additionally, in the step S306, the polarization isolation of the bi-polarized antenna 120 is obtained based on the value A and the value B. For example, when both of the values are in dBm format, the polarization isolation value may be calculated by subtracting the value B from the value A, the result of which is in dB format. A polarization isolation value indicates the amount of energy loss from the transmission of one antenna due to the absorption of the energy of the other antenna within the bi-polarized antenna system, thus is an indicator of the performance of the bi-polarized antenna system as appreciated by those skilled in art.

If a voltage standing wave ratio of the bi-polarized antenna is expected to be measured (Step 302, VSWR), in step S307 of FIG. 3, a reflecting signal of the first antenna is coupled. The reflecting signal of the first antenna is generated due to power reflecting from the first antenna when the first antenna emits the transmitting signal to space. In the step S308, the power of the transmitting signal of the first antenna is measured as an analog result, and the power of the reflecting signal of the first antenna is measured as another analog result. Furthermore, in the step S309, the analog result of the power of the transmitting signal of the first antenna is converted into a digital result, which may be saved as a value A, and the analog result of the power of the reflecting signal of the first antenna is converted into another digital result, which may be saved as a value C. In the step S310, the voltage standing wave ratio (VSWR) of the bi-polarized antenna 120 is calculated based on the value A and the value C. For example, when both of the values are in dBm format, the VSWR value may be calculated by subtracting C from A, i.e. A-C. The VSWR serves as an indicator of the performance of the bi-polarized antenna 120 (in particular the first antenna), i.e. the communication device, as appreciated by those skilled in art.

Additionally, the method shown in FIG. 3 may further include a step S311 of outputting the calculated polarization isolation and/or VSWR for further processing.

The sequence of those steps of the method being performed is not limited to the above, and the steps may be performed in any sequence and/or in a parallel manner. Although the method of the disclosure is shown and described in connection with FIG. 3, it should be appreciated that it is not necessary for all of the steps in FIG. 3 to be performed In accordance with an illustrative embodiment, the above method may be realized by the performance detection unit 100. Specifically, the above step S301 may be performed by the directional coupler 101 of FIG. 1, in which the directional coupler 101 couples a transmitting signal of the antenna 121. The above step S302 may be performed by the processing unit 106, in which the processing unit 106 decides which one of the polarization isolation and the voltage standing wave ratio of the bi-polarized antenna need to be calculated. The above step S303 may be performed by the directional coupler 101, in which the directional coupler 101 couples an inducing signal of the antenna 122 which is induced wirelessly in the antenna 122 by receiving the transmitting signal of the antenna 121, and outputs the coupled transmitting signal of the antenna 121 and the coupled inducing signal of antenna 122 to the power detector 104 via respective output ports of the directional coupler 101, for example, but not limited to, the transmitting signal output port 1011 and the reflecting and inducing signal output port 1014. The above step S304 may be performed by the power detector 104, in which the power detector 104 receives the coupled transmitting signal of the antenna 121 and the coupled inducing signal of antenna 122 from the respective output ports of the directional coupler 101, and measures the power of the transmitting signal of the antenna 121 to output an analog result to the A/D converter 105, and measures the power of the inducing signal of the antenna 122 to output another analog result to the A/D converter 105.

The above step S305 may be performed by the A/D converter 105, in which the A/D converter 105 converts the analog result of the power of the transmitting signal of the antenna 121 into a digital result signal, converts the analog result of the power of the inducing signal of the antenna 122 into another digital result signal, and outputs the converted digital result signals to the processing unit 106. The above step S306 may be performed by the processing unit 106, in which the processing unit 106 receives the digital result signal of the power of the transmitting signal of the antenna 121 to save it as a value A, and receives the digital result of the power of the inducing signal of the antenna 122 to save it as a value B, and the processing unit 106 calculates the polarization isolation of the bi-polarized antenna 120 based on the value A and the value B, for example by subtracting the value B from the value A when both of the values are in dBm format. These values may be stored in internal memory of the processing unit.

The above step S307 may be performed by the directional coupler 101, in which the directional coupler 101 couples a reflecting signal of the antenna 121 which is generated due to power reflecting from the antenna 121 when the antenna 121 emits the transmitting signal to space, and outputs the coupled transmitting signal of the antenna 121 and the coupled reflecting signal of antenna 121 to the power detector 104 via respective output ports of the directional coupler 101, for example, but not limited to, the transmitting signal output port 1011 and the reflecting and inducing signal output port 1012. The above step S308 may be performed by the power detector 104, in which the power detector 104 receives the coupled transmitting signal of the antenna 121 and the coupled reflecting signal of antenna 121 from the respective output ports of the directional coupler 101, and measures the power of the transmitting signal of the antenna 121 to output an analog result to the A/D converter 105, and measures the power of the reflecting signal of the antenna 121 to output another analog result to the A/D converter 105. The above step S309 may be performed by the A/D converter 105, in which the A/D converter 105 converts the analog result of the power of the transmitting signal of the antenna 121 into a digital result signal, converts the analog result of the power of the reflecting signal of the antenna 121 into another digital result signal, and outputs the converted digital result signals to the processing unit 106. The above step S310 may be performed by the processing unit 106, in which the processing unit 106 receives the digital result of the power of the transmitting signal of the antenna 121 to save it as a value A, and receives the digital result of the power of the reflecting signal of the antenna 121 to save it as a value C, and the processing unit 106 calculates the voltage standing wave ratio (VSWR) of the antenna 121 based on the value A and the value C, for example by subtracting the value C from the value A when both of the values are in dBm format. These values may be stored in internal memory of the processing unit.

Additionally, the step S311 of outputting the calculated polarization isolation and/or voltage standing wave ratio for a further processing may be performed by the output unit 107 via at least one of antenna cables 131, 132, a separate wire/line 140, a wireless connection 150 or the like.

In accordance with an illustrative embodiment, the whole operation process of the performance detection unit 100 may be mirrored as to the antennas 121 and 122 such that the polarization isolation and/or the VSWR of the antenna 122 may be calculated in the same way.

In accordance with another illustrative embodiment, the above method of FIG. 3 may be realized by the performance detection unit 200. Specifically, the above step S301 may be performed by the directional coupler 201, in which the directional coupler 201 couples a transmitting signal of the antenna 121. The above step S302 may be performed by the processing unit 206, in which the processing unit 206 decides which one of the polarization isolation and the voltage standing wave ratio of the bi-polarized antenna needs to be calculated. The above step S303 may be performed by the directional coupler 201, the directional coupler 202 and the RF switch 203, in which directional coupler 202 couples an inducing signal of the antenna 222 which is induced wirelessly by receiving the transmitting signal of the antenna 221, the directional coupler 201 outputs the coupled transmitting signal of the antenna 221 to the power detector 204 through the RF switch 203 in response to the RF switch 203 being switched to the transmitting signal output port 2011 of the directional coupler 201 under the control of the processing unit 206, and the directional coupler 202 outputs the coupled inducing signal of the antenna 222 to the power detector 204 through the RF switch 203 in response to the RF switch 203 being switched to the reflecting and inducing signal output port 2022 of the directional coupler 202 under the control of the processing unit 206, respectively.

The above step S304 may be performed by the power detector 204, in which the power detector 204 receives the coupled transmitting signal of the antenna 221 and the coupled inducing signal of the antenna 222 from the respective output ports of the directional couplers 201 and 202 through the RF switch 203, and measures the power of the transmitting signal of the antenna 221 to output an analog result to the A/D converter 205, and measures the power of the inducing signal of the antenna 222 to output another analog result to the A/D converter 205.

The above step S305 may be performed by the A/D converter 205, in which the A/D converter 205 converts the analog result of the power of the transmitting signal of the antenna 221 into a digital result signal, converts the analog result of the power of the inducing signal of the antenna 222 into another digital result signal, and outputs the converted digital result signals to the processing unit 206. The above step S306 may be performed by the processing unit 206, in which the processing unit 206 receives the digital result of the power of the transmitting signal of the antenna 221 to save it as a value A, and receives the digital result of the power of the inducing signal of the antenna 222 to save it as a value B, and the processing unit 206 calculates the polarization isolation of the bi-polarized antenna 220 based on the value A and the value B, for example by subtracting the value B from the value A when both of the values are in dBm format. These values may be stored in internal memory of the processing unit.

The above step S5307 may be performed by the directional coupler 201 and the RF switch 203, in which the directional coupler 201 couples a reflecting signal of the antenna 221 which is generated due to power reflecting from the antenna 221 when the antenna 221 emits the transmitting signal to space, and outputs the coupled transmitting signal of the antenna 221 to the power detector 204 through the RF switch 203 in response to the RF switch 203 being switched to the transmitting signal output port 2011 of the directional coupler 201 under the control of the processing unit 206, and the directional coupler 201 outputs the coupled reflecting signal of the antenna 221 to the power detector 204 through the RF switch 203 in response to the RF switch 203 being switched to the reflecting and inducing signal output port 2012 of the directional coupler 201 under the control of the processing unit 206, respectively. The above step S308 may be performed by the power detector 204, in which the power detector 204 receives the coupled transmitting signal of the antenna 221 and the coupled reflecting signal of the antenna 221 from the respective output ports of the directional couplers 201 through the RF switch 203, and measures the power of the transmitting signal of the antenna 221 to output an analog result to the A/D converter 205, and measures the power of the reflecting signal of the antenna 221 to output another analog result to the A/D converter 205. The above step S309 may be performed by the A/D converter 205, in which the A/D converter 205 converts the analog result of the power of the transmitting signal of the antenna 221 into a digital result signal, converts the analog result of the power of the reflecting signal of the antenna 221 into another digital result signal, and outputs the converted digital result signals to the processing unit 206. The above step S310 may be performed by the processing unit 206, in which the processing unit 206 receives the digital result of the power of the transmitting signal of the antenna 221 to save it as a value A, and receives the digital result of the power of the reflecting signal of the antenna 221 to save it as a value C, and the processing unit 206 calculates the voltage standing wave ratio (VSWR) of the antenna 221 of the bi-polarized antenna 220 based on the value A and the value C, for example by subtracting the value C from the value A when both of the values are in dBm format. Additionally, the step S311 of outputting the calculated polarization isolation and/or VSWR for further processing may be performed by the output unit 207 via at least one of antenna cables 231, 232, a separate wire/line 240, a wireless connection 250 or the like.

The whole operation process of the performance detection unit 200 may be mirrored as to the antennas 221 and 222 such that the polarization isolation and/or the VSWR of the antenna 222 may be calculated in the same way.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for detecting performance of a bi-polarized antenna including a first antenna and a second antenna, comprising:
at least one directional coupler, directly connected to the first antenna and the second antenna of the bi-polarized antenna via a first antenna cable and a second antenna cable, respectively, the at least one directional coupler configured to couple a transmitting signal of the first antenna and another signal from the bi-polarized antenna, the another signal being induced in the second antenna by receiving the transmitting signal of the first antenna,
wherein the at least one directional coupler includes a transmitting signal output port configured to output the transmitting signal of the first antenna and an another signal output port configured to output the another signal being induced in the second antenna;
a power detector, directly connected to the at least one directional coupler, configured to:
receive, from the transmitting signal output port, the coupled transmitting signal of the first antenna,
receive, from the another signal output port, the coupled another signal being induced in the second antenna by receiving the transmitting signal of the first antenna, and
measure a power of the received transmitting signal and a power of the received another signal as analog results, respectively;
an analog-digital converter, directly connected to the power detector, configured to convert the analog results into digital results; and
a processing unit, connected to the analog-digital converter, configured to calculate a difference of the digital results.

2. The system of claim 1, wherein the processing unit is further configured to calculate a polarization isolation of the bipolarized antenna based on the digital result of power of the inducing signal and the digital result of the power of the transmitting signal.

3. The system of claim 1, wherein the another signal is a reflecting signal of the transmitting signal, and the processing unit is further configured to calculate a voltage standing wave ratio of the first antenna based on the digital result of the power of the reflecting signal and the digital result of the power of the transmitting signal.

4. The system of claim 1, wherein the at least one directional coupler is a low insertion loss coupler.

5. The system of claim 1, wherein an operation of the system is started up by the processing unit according to a control signal or the processing unit is constantly running to perform detection.

6. The system of claim 1, further comprising an output unit configured to output the difference calculated by the processing unit via at least one of an antenna cable, a separate output line, and a wireless connection.

7. The system of claim 1, wherein attenuation ratio provided by the coupling operation of the at least one directional coupler is designed in such a manner that the power of the coupled signals falls within a range −10~−70 dBm.

8. A method of detecting performance of bi-polarized antenna including a first antenna and a second antenna, comprising:
coupling, via at least one directional coupler, from the bi-polarized antenna, a transmitting signal of the first antenna and another signal that is induced in the second antenna by the first antenna transmitting the transmitting signal, the at least one directional coupler being directly connected to the first antenna and the second antenna of the bi-polarized antenna via a first antenna cable and a second antenna cable, respectively;
receiving, from the at least one directional coupler, to a power detector, the coupled transmitting signal of the first antenna via a transmitting signal output port and the coupled another signal via an another signal output port;
measuring, via the power detector, a power of the received transmitting signal and a power of the received another signal as analog results, respectively;
outputting, from the power detector, to an analog-digital converter, the analog results;
converting, via the analog-digital converter, the analog results into digital results; and
calculating a difference of the digital results of the power of the transmitting signal and the another signal.

9. The method as recited in claim 8, wherein the method further comprises:
calculating a polarization isolation of the bi-polarized antenna based on the digital result of the power of the inducing signal and the digital result of the power of the transmitting signal.

10. The method as recited in claim 8, wherein the another signal is a reflecting signal of the first antenna, and the method further comprises:

calculating a voltage standing wave ratio of the first antenna based on the digital result of the power of the reflecting signal and the digital result of the power of the transmitting signal.

11. A device for detecting performance of a bi-polarized antenna, comprising:
- at least one directional coupler, directly connected to a first antenna and a second antenna of the bi-polarized antenna via a first antenna cable and a second antenna cable, respectively, the at least one directional coupler configured to couple a signal transmitted by the first antenna and another signal of the bi-polarized antenna that is an inducing signal that is induced in the second antenna of the bi-polarized antenna by the first antenna,
- wherein the at least one directional coupler includes a transmitting signal output port configured to output the coupled transmitting signal of the first antenna and an another signal output port configured to output the coupled another signal being induced in the second antenna;
- a power detector, directly connected to the at least one directional coupler, configured to:
  - receive, from the transmitting signal output port, the coupled transmitting signal of the first antenna,
  - receive, from the another signal output port, the coupled another signal being induced in the second antenna by the first antenna, and
  - measure a power of the received signal transmitted by the first antenna and a power of the received another signal of the bi-polarized antenna as analog results, respectively;
- an analog-digital converter, directly connected to the power detector, configured to convert the analog results into digital results; and
- a processing unit, connected to the analog-digital converter, configured to calculate a difference of the digital results.

* * * * *

UNITED STATES PATENT AND TRADEMARK OFFICE
CERTIFICATE OF CORRECTION

| | |
|---|---|
| PATENT NO. | : 8,902,111 B2 |
| APPLICATION NO. | : 12/707510 |
| DATED | : December 2, 2014 |
| INVENTOR(S) | : Liu |

Page 1 of 1

It is certified that error appears in the above-identified patent and that said Letters Patent is hereby corrected as shown below:

In the Specification

In Column 1, under Title,
insert -- CROSS-REFERENCE TO RELATED APPLICATION
The present application claims the benefit of Chinese patent Application No. 200910167463, filed on August 25, 2009. --.

In Column 5, Line 1, delete "such as" and insert -- such as three, four, five and the like. Attenuation ratio provided by the coupling operation of --, therefor.

In Column 6, Line 39, delete "performed" and insert -- performed. --, therefor.

In Column 8, Line 51, delete "S5307" and insert -- S307 --, therefor.

In Column 9, Line 57, delete "and or" and insert -- and/or --, therefor.

Signed and Sealed this
Ninth Day of June, 2015

Michelle K. Lee
*Director of the United States Patent and Trademark Office*